June 14, 1966  H. KARLBY ET AL  3,255,630
POSITIVE DISPLACEMENT ROTARY GAS METER
Filed Nov. 4, 1963  3 Sheets-Sheet 1

INVENTORS
HENNING KARLBY
WINSTON F. Z. LEE
RICHARD V. WOODWARD

BY *Strauch, Nolan & Neale*

ATTORNEYS

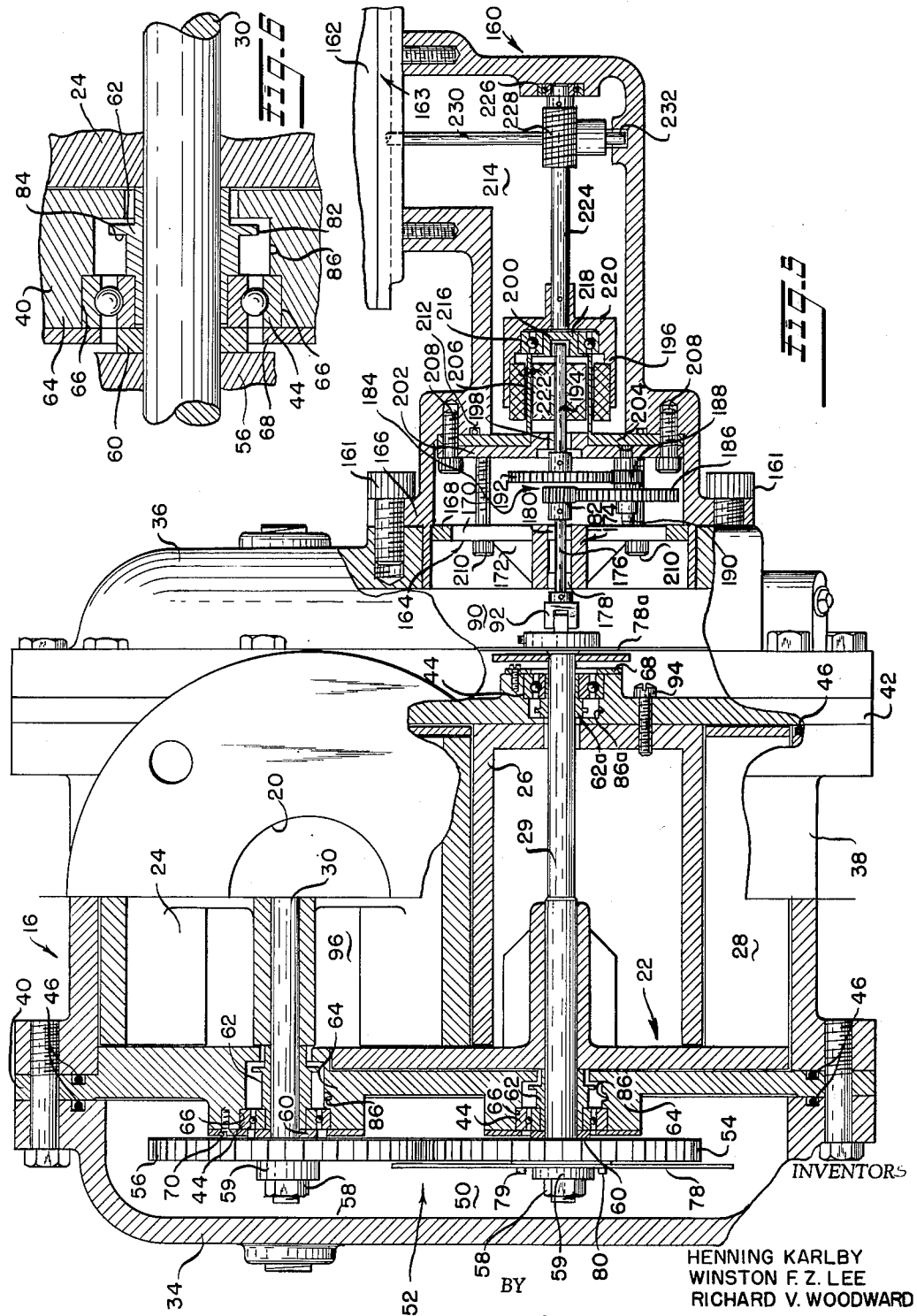

INVENTORS
HENNING KARLBY
WINSTON F. Z. LEE
RICHARD V. WOODWARD

BY Strauch, Nolan & Neale

ATTORNEYS

United States Patent Office 3,255,630
Patented June 14, 1966

3,255,630
POSITIVE DISPLACEMENT ROTARY
GAS METER
Henning Karlby, Pittsburgh, Winston F. Z. Lee, Verona, and Richard V. Woodward, Pittsburgh, Pa., assignors to Rockwell Manufacturing Company, Pittsburgh, Pa., a corporation of Pennsylvania
Filed Nov. 4, 1963, Ser. No. 323,191
13 Claims. (Cl. 73—253)

The present invention relates to rotary positive displacement gas metering apparatus and more particularly to such apparatus having novel rotating component parts.

Up to the present, lobe-type gas meters are the only type of rotary positive displacement mechanism widely used in gas flow measurement. A lobe-type meter consists of two figure-eight shaped rotors or lobes mounted on separate spaced apart shafts and kept in the proper angular relationship by means of timing gears, i.e. 90 degrees out of phase with respect to each other during rotation. Gas is trapped and displaced through the meter between the neck portions of each figure-eight shaped rotor and the meter housing as differential gas pressure turns the rotors seriatim. Consequently, the discharge is periodically pulsating in nature. The amount of gas so entrapped and displaced through the meter is of measurable volume and in theory each revolution of the rotors discharges a known volume of gas from the meter.

Although the lobe-type meter has gained wide commercial acceptance, it has inherent within its construction several maleficent features:

First, accurate timing is extremely critical to maintain a close line seal or running clearance between the rotors. This is necessary to prevent leakage, and also to prevent the rotors from striking each other during rotation. This critical timing requirement of the lobe-type meter demands the use of expensive precision gears of fine pitch which are in turn more susceptible to jamming due to the presence of foreign particles. The critical timing and the necessary small running clearance or line seal prohibits the lobe-type meter from being readily disassembled and reassembled by the user without upsetting the meter calibration and affecting its performance.

Second, the characteristic cyclic variation in delivery or discharge, inseparable from lobe design, causes correspondingly large undesirable pressure pulsations, especially when used in reasonable close forward proximity to mechanisms requiring a gas supply under uniform pressure for purposes of optimum performance and safety. This characteristic cyclic variation in delivery is responsible for not only a pronounced fluctuation in the accuracy of measurement, but also for detrimental head loss over the entire operating flow range. The cyclic variations also produce shaft vibrations causing erratic flow measurements at certain critical shaft speeds which may deviate as much as several percent from correct values. These shaft vibrations are harmonically sinuous in nature and become almost destructive in character at maintained critical shaft speeds.

Third, alternating or seriatim driving of first one rotor and then the next creates a pulsating oppositely directed torque load resulting in a periodic timing gear back lash phenomenon. This effect coupled with the already noted variations in delivery produce a cyclic impact load on the timing gears which will inevitably, after prolonged use, result in uneven wear on the gear teeth. Maintenance costs are high since the meter performance is adversely affected as wear of the gear teeth becomes appreciable.

While some attempts have been made to design a practicable vane type positive displacement rotary meter, such attempts have failed to achieve a performance level sufficient for commercial acceptance. Hence, at present the lobe-type meter with its manifested deficiencies, remains the only positive displacement rotary meter widely used in gas flow measurement.

Accordingly, it is a primary object of the present invention to overcome the above-mentioned lobe-type meter deficiencies by providing a novel positive displacement rotary gas meter apparatus having the following novel advantages:

(1) Uniformily high accuracy of measurement of flow through the meter throughout the entire operating range;
(2) Essentially uniform rate of delivery or discharge of gas throughout the cycle of operation;
(3) Non-pulsating pressure characteristics throughout the cycle of operation;
(4) Nominal substantially uniform head loss throughout the cycle of operation, and a smooth head loss curve throughout the entire operating range;
(5) Essentially noiseless operation throughout the cycle of operation;
(6) Smooth operation at all speeds with essentially uniform nominal loading and wearing of moving parts resulting in long life with sustained accuracy of measurement of flow;
(7) Non-critical timing and non-alternative driving of the timing gears;
(8) Non-precise large tolerance moving parts without derogation of performance;
(9) Readily disassemblable and reassemblable without jeopardizing the meter calibration;
(10) Simple geometry and construction for ease of assembling and for trouble-free operation even when used to meter dirty fluids such as gas from oil wells;
(11) Unusually large running clearances between moving parts of the meter by utilizing the area sealing phenomena;
(12) Self-cleaning whereby foreign matter will not generally interfere with operation;
(13) Alternatively horizontally or vertically mountable; and
(14) Unitable with essentially all standard meter instrumentation.

To achieve the above listed novel advantages, it is a chief object to provide in a positive displacement rotary gas meter a novel rotor mechanism having specially constructed vanes and a novel rotary abutment mechanism.

It is a further object of the instant invention to novelly provide in a rotary meter a magnet drive assembly interconnecting the instrumentation or register bear box and the rotor shaft, thereby obviating need for a stuffing box.

Another object is to provide novel oil return bushings and drains to provide continuous lubrication and to segregate without excessive head loss the lubricating oil from the gas being metered, operable irrespective of horizontal or vertical orientation of the meter.

Other objects and novel features will become apparent by reference to the appended claims and as the description proceeds in connection with the accompanying drawings wherein:

FIGURE 5 is an end elevational view partly broken away in cross section illustrating the interrelationship between the rotor, rotary abutment, and the flow measuring register or instrument;

FIGURE 6 is a cross sectional view illustrating the novel oil-seal bushing of the present invention in its shaft-carried assembled position;

*General description*

Figure 1:
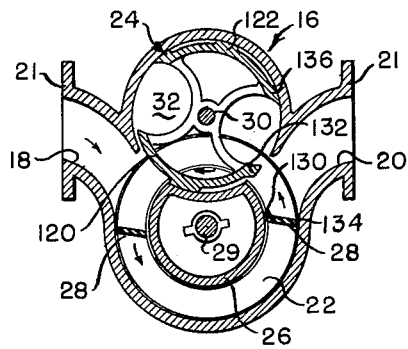
FIGURES 1 through 4 are cross sectional views through the preferred embodiment of the instant invention illustrating four sequential operational positions of the rotor vanes as they spacedly mate with the rotary abutment during rotation.

Referring now to the drawings wherein like parts are referred to with like numerals throughout the figures, FIGURES 1 through 4 broadly illustrate sequential operational positions, each at approximately 45° greater angular displacement, of the preferred embodiment of the present invention. In general it includes body 16 having influent opening 18 and effluent opening 20. These openings each have a flange 21 adapted to be secured in a fluid conveying line. Intermediate influent 18 and effluent 20, within body 16, are rotor 22 and rotary abutment 24 which rotate in opposite directions. Within rotor 22 and adjacent rotary abutment 24 is body-mounted stationary abutment 26. Fluid entering influent opening 18 impinges upon non-radial vanes 28 to rotate rotor 22 in a counter-clockwise direction about shaft 29 (as viewed in FIGURES 1–4). In this way vanes 28, during rotation, divide off a measurable quantity of fluid at the influent, carry it between the meter housing and stationary abutment 26 and discharge it at the effluent. Meshing timing gears attached to the ends of rotor and rotary abutment shafts 29 and 30 cause clockwise rotation of rotary abutment 24 responsive to counter-clockwise rotation of rotor 22. The rotation of rotor 22 and rotary abutment 24 is synchronized to permit vanes 28 to be spacedly received in arcuate spaces 32 and thereby prevent contact therebetween.

The rotation of rotor shaft 29 drives, through separate means, an instrument of conventional construction which accurately records the measured volume of fluid passing through the meter. The entire meter may be disassembled and reassembled for purposes of maintenance or inspection without interference with the meter calibration.

*Detailed description of a preferred embodiment*

As best seen in FIGURE 5, end bells 34 and 36 are bolted to but separated from main body casing 38 by side plates 40 and 42, respectively, which carry main bearings 44 for journalling shafts 29 and 30. The flanges of end bells 34 and 36 and side plates 40 and 42 are sealed against lubrication and fluid leakage by O rings 46. External of said plate 40 and enclosed by end bell 34 are lubrication chamber 50 and timing gear assembly 52.

Timing gear assembly 52 includes non-precise coarse pitch driving timing gear 54 and meshing driven timing gear 56 carried on the ends of shafts 29 and 30, respectively. These timing gears are sandwiched between spacers 59 and 60 and are biased in position by shaft-mounted nut and washer assemblies 58.

As illustrated in FIGURE 6, spacers 60 also bear against the inner race of main bearings 44 located in bosses 64 of side plate 40, and are non-rotatably carried on shafts 29 and 30, respectively. The inner race of each bearing 44 is press fitted over the outside reduced diameter end of shaft-mounted bushing 62 and the outer race of each bearing 44 is held in its appropriate open groove 66 by a bearing retainer 68 which is fastened to plate 40, as by screws 70.

Lubrication chamber 50 houses a supply of appropriate lubricating oil which is distributed to the moving parts therein by the splashing centrifugal action of disc-shaped oil slinger 78 (FIGURE 5). Oil slinger 78 is spaced away from gear 54 by spacer 79 and is secured thereto by mounting screws 80 so as to be concentric of shaft 29 and operatable to distribute the oil irrespective of whether the meter is in a horizontal or vertical attitude. The oil so distributed is prevented from escaping from chamber 50 through the central opening in bosses 64 by oil-seal bushings 62 while at the same time a small amount of the fluid being metered is permitted to enter chamber 50 through shaft clearances in bosses 64 and bearings 44 to equalize the pressure on each side of plates 40 and 42. To lubricate the moving parts in chamber 50 oil passes along gears 54 and 56, between spacers 60 and bearing retainers 68, through gearings 44 onto the outer periphery of and against annulus 82 of bushings 62. During rotation the linear speed of outermost surface of annulus 82 is significantly greater than the linear speed of any other surface of bushings 62. The tangential force component of the speed of annulus 82 is of sufficient magnitude to cause excess oil on side 84, which faces chamber 50, to flow outwardly and be thrown against the inside wall of bosses 64 to drain back into chamber 50 through sloped oil return drain holes 86 inside plate 40. In addition to acting as an oil seal, bushings 62 function to space rotor 22 and rotary abutment 24 away from side plates 40 and 42 thereby facilitating unobstructed rotation of those moving parts.

With further reference to FIGURE 5, side plate 42 supports the right-hand end of shaft 29 in substantially the same way as plate 40 supports the left-hand end, as explained above, with bearing 44, housing 62a and screw secured bearing retainer 68 coacting in the same manner. Here, however, bushing 62a terminates adjacent plate 42 and does not abut rotor 22. The right-hand end of shaft 29 passes beyond plate 42 into a second lubrication chamber 90 to actuate register drive dog 92 and is equipped with oil slinger 78a which in combination with chamber 90 function as do chamber 50 and oil slinger 78. Oil drain 86a in plate 42 returns oil thrown from bushing 62a during rotation in the manner of drains 86 of plate 40, as explained above.

The right end of shaft 30 (not shown) is bearing supported in plate 42, in like manner as is the left-hand end thereof, and terminates at that location without extending beyond plate 42.

Stationary abutment 26 is held in fixed position against plate 42, about shaft 29, inside rotor vanes 28 and adjacent rotary abutment 24 by mounting screws 94 for purposes hereinafter explained.

Fluid transmitting chamber 96 is located between influent and effluent openings 18 and 20 and side plates 40 and 42, houses rotor 22, rotary abutment 24 and stationary abutment 26, and is sealed against unmetered fluid leakage by a plurality of area seals described below. Fluid is, however, permitted to enter chambers 50 and 90 through bosses 64 to equalize the pressure on each side of plates 40 and 42.

Figure 7:
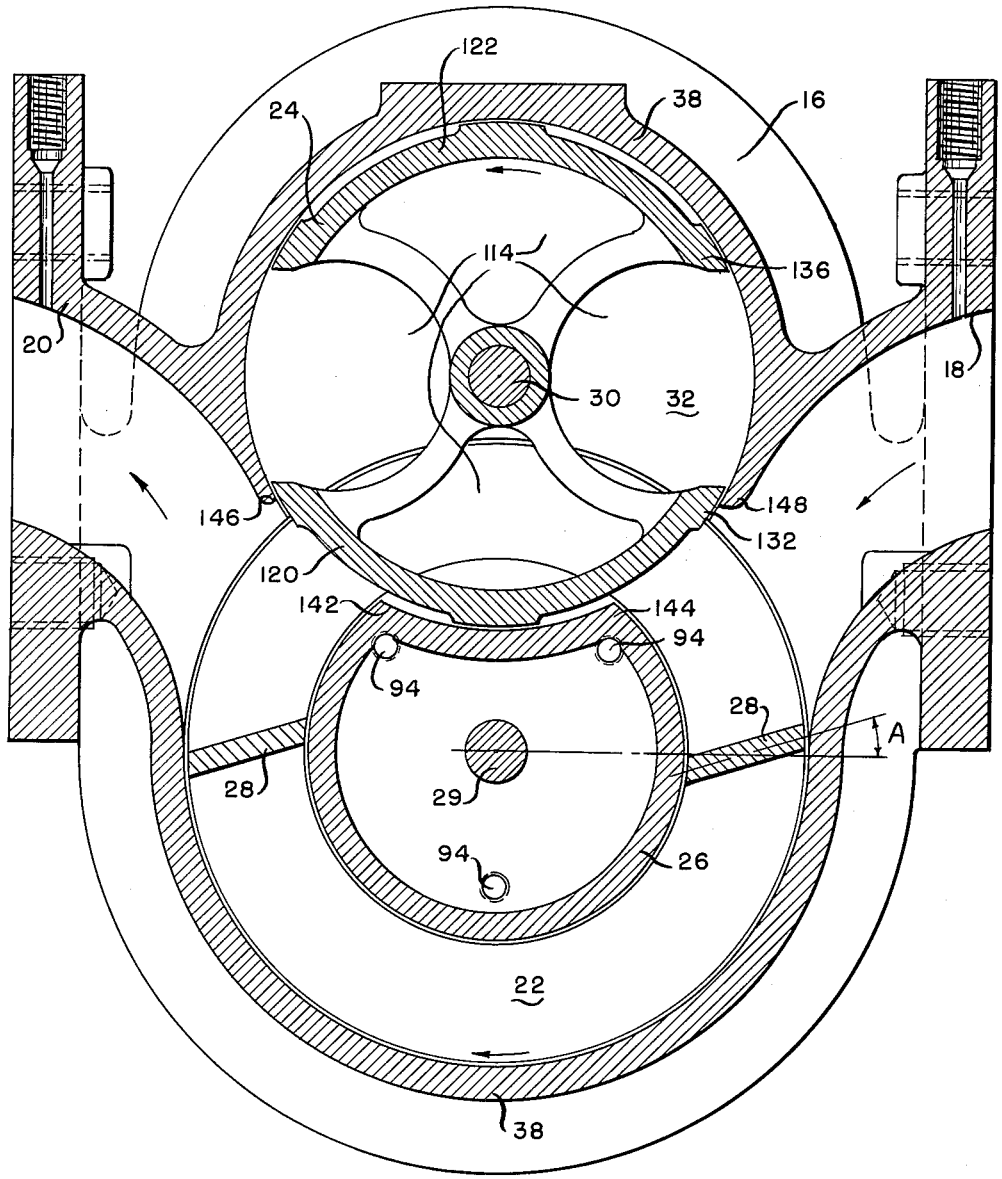
FIGURE 7 is an enlarged cross sectional view similar to those shown in FIGURES 1 through 4.

The novel, highly accurate, steady flow delivery, low head loss operation of the instant positive displacement meter may be better appreciated by reference to FIGURE 7 and the following description. During operation, fluid under pressure enters through opening 18, flows alongside stationary abutment 26 and drivingly impinges on non-radial vanes 28 to turn rotor 22 clockwise and rotary abutment 24 counter-clockwise and exits through opening 20. The movement of vanes 28, preferably two in number, and rotary abutment 24 is synchronized through timing gears 54 and 56 to spacedly mate vanes 28 with spaces 32.

Figure 8:
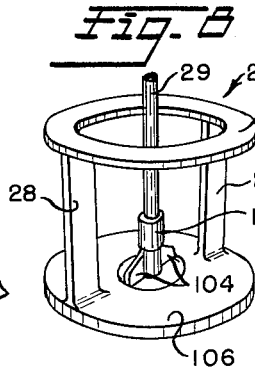
FIGURE 8 is a perspective view illustrating the novel rotor assembly of the preferred embodiment of the present invention.

Rotor 22, in the preferred embodiment, is independently illustrated in FIGURE 8, and, in addition to shaft 29, comprises four principal integral pieces: hollow shaft-receiving housing 102 which may include stiffeners 104, disc-shaped rotor hub end plate 106, non-radial longitudinal extending planar vanes 28 and annular end plate 108.

It has been empirically determined that head loss through the instant meter may be reduced to nominal magnitudes partly by utilizing a pair of longitudinal extending thin rotor vanes 28 non-radially inclined with respect to shaft 29 to cause the inner edges of the vanes to lead the outer edges in the usual direction of rotation, as indicated by angle A of FIGURE 7.

Figure 2:
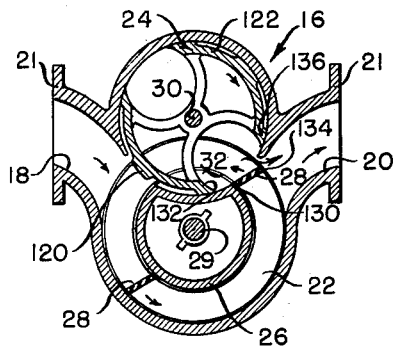
Figure 3:
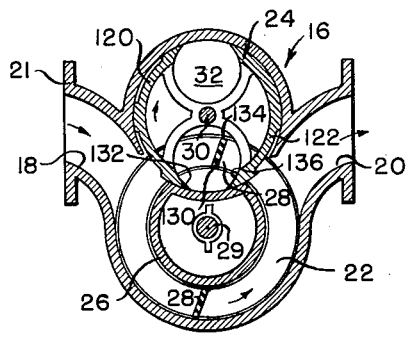
Figure 4:
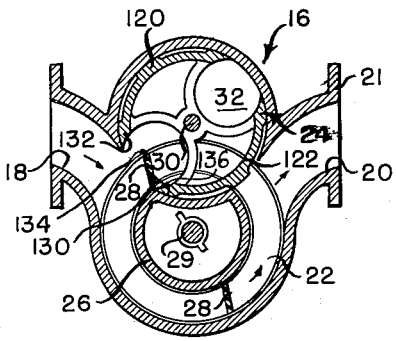

The optimum angle A has been found to be on the order of 16° from the radial when metering gas. Optimum angle A will, however, vary depending on the type of fluid to be metered and the relationship and dimensions of the component parts of the meter, e.g., the size of spaces 32. The slant of vanes 28, as illustrated in FIGURE 2, provides for a more gradual entry of the vanes into space 32 of rotary abutment 24 so that there is a lack of performance influencing head loss consequential of the impact of the vanes against the fluid.

By minimizing the thickness of vanes 28, head loss through the meter is further reduced, but the reduction in thickness is limited by needed flexural rigidity as well as that dimension required to provide effective area edge seals between vanes 28 and main casing 38, and vanes 28 and stationary abutment 26 to prevent leakage of unmetered fluid through the meter. The thickness of vanes 28 may be on the order of 0.2 of an inch for a meter having a rated capacity in the range of 3,000 cubic feet per hour for a fluid of approximately 0.6 specific gravity. To prevent undue and possibly damaging flexure to thin vanes 28, with resulting unmetered fluid leakage, rigidifying annular end plate 108 is integrally attached to the end of vanes 28 opposite plate 106.

Figure 9:
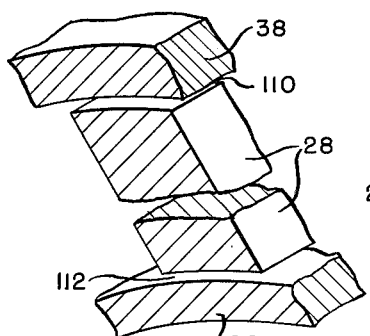
FIGURE 9 is a cross sectional view in perspective illustrating the area seal phenomenon achieved by coaction of the rotor vanes and the adjacent meter body and stationary abutment.

The edges of vanes 28 provide area seals 110 and 112, as opposed to line seals provided by the rotors of the lobe-type meter, as illustrated in FIGURE 9. The edges of vanes 28 are machined to match main casing 38 and stationary abutment 26 and exhibit a surprisingly high resistance to fluid flow which effectively prohibits unmetered fluid leakage therealong, even where the running clearances are as much as approximately three times the minimum lobe-type clearances. By using area seals, the running clearances of the instant meter may be on the order of 0.006″ or more depending upon the meter size.

Rotary abutment 24 is accommodated in an arcuate recess in main casing 38, and is constructed to further lessen the fluid impact of vanes 28 upon entry by providing a single open rotary abutment chamber 114 which facilitates ease of fluid displacement and reduces pressure changes in the chamber and head loss of the meter.

Figure 10:
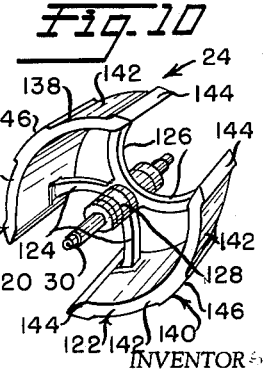
FIGURE 10 illustrates in perspective the novel preferred rotary abutment of the present invention.

Rotary abutment 24 is preferably of integral construction, as illustrated in FIGURE 10, and consists of two arcuate shells, 120 and 122, connected at their central portions by a pair of interconnected bifurcated ribs 124 and 126 which may be of any desired cross sectional shape, all of which is non-rotatably carried on shaft 30 by hub structure 128. This construction creates a large single volume chamber 114 which also aids in minimizing compression and expansion of compressible fluids when vanes 28 move in and out of this volume during rotation, with resultant lowered head loss, less pressure pulsation and less meter noise. Thus, the instant meter runs relatively smoothly at all operating speeds and provides essentially uniformly high acuracy of measurement throughout the entire flow range.

There is no contact between the rotary abutment and the rotor, the correct angular relationship between these two parts being maintained by timing gears. The timing, however, need not be accurate. As long as the timing is not excessively out of phase so as to cause the vanes to hit the tips of the edges of the rotary abutment shells, the meter performance will remain unaffected. That is to say, forward edge 130 (FIGURE 1) of vane 28 must clear edge 132 of shell 120 and trailing edge 134 of vane 28 (FIGURE 2) must miss edge 136 of shell 122.

Referring again to FIGURE 10, faces 138 and 140 of rotary abutment shells 120 and 122 are recessed at 142 to provide two edge ridges 144 and one central ridge 146 on each shell. This structure serves to provide area seals with main casing 38 and stationary abutment 26, to reduce fluid drag friction and to make the meter generally self-cleaning even when dirty fluids, such as oil well gas, is being metered by transferring the dirt and foreign particles from the meter influent to the meter effluent by means of recesses 142.

Ridges 144 and 146 co-act with main casing 38 and stationary abutment 26 to form at least one area seal at each location during all operative positions as shown in FIGURE 7. The chord between edges 132 and 136 is greater than the chords between: (1) tips 142 and 144 of stationary abutment 26; (2) tip 142 of stationary abutment 26 and edge 146 of main casing 38, and (3) tip 144 of stationary abutment 26 and edge 148 of main casing 38. By this construction chamber 114 intermediate shells 120 and 122 is never simultaneously open to both the influent and effluent openings of the meter and hence unmetered fluid leakage through the rotary abutment is obviated.

In addition to main casing 38, body 16 includes gear box housing 160 (FIGURE 5) which is secured to end bell 36 by cap screws 161 and houses the mechanisms which drive flow registering instrument 162 responsive to the rotation of shaft 29. Instrument 162 may be any standard meter instrumentation positioned upon index plate 163 in any one of several positions, including horizontal or vertical orientation.

At the junction between end bell 36 and housing 160 is end plate 164 fitted in open annular space 166 of housing 160. End plate 164 includes annular ring 168, spaced radial spokes 170 with stiffeners 172 and offset hub 174, which journals drive shaft 176 in a pair of Oilite bearings 178 and 180.

Shaft 176 rotates responsive to rotor shaft 29 and is pin connected at its ends to dog drive 92 and gear 182 of reduction gear assembly 184. Reduction gear assembly 184 receives lubrication between spokes 170 of end plate 164 and includes, in addition to gear 182, idler gears 186 and 188, non-rotatably carried on idler shaft 190 between appropriate spacers, and gear 192, which is pin connected to driving shaft 194. In one commercial model a rotation speed reduction of 261:1 is achieved between shaft 29 and instrument 162.

Shaft 194 forms part of magnetic drive assembly 196, which is used to obviate the need for a conventional stuffing box. Shaft 194 is journalled in Oilite bearings 198 and 200, which are mounted in bearing plate 202 and magnet well 204, respectively, and non-rotatably carries driving magnet 206. Bearing plate 202 and magnet well 204 are contiguously secured together to gear box housing 160 at their outwardly extending flanges by cap screws 208 threaded into the gear box housing and by the threaded ends of cap screws 210 which are secured in threaded apertures (not shown) of bearing plate 202. O ring 212 prevents leakage of the gas being measured into chamber 214.

Magnet well 204 forms a static seal between reduction gear assembly 184 and chamber 214 and press-fittingly received bearing 216 on the outside thereof at the offset central portion 218.

Bearing 216 rotatably carries magnet holder 220 which is press-fitted over driven magnet 222 and pin connected to shaft 224. The right-hand end of shaft 224, as viewed in FIGURE 5, seats in bearing 226, which is supported in a gear box housing 160, and carries worm gear 228, which drives a gear wheel (not shown) on instrument shaft 230 to actuate register 162. Shaft 230 is journalled at its lower end of Oilite bearing 232.

While the meter is operable with flow in either direction, flow is preferably in the direction shown in FIGURES 1–4 and 7 since the rotation so produced is accommodated by conventional registers without requiring modification. Flow in the direction opposite FIGURE 7 would require a left-hand worm drive.

An extensive performance comparison between the principal vane-type meter and said widely used lobe-type meter, each having rate capacities of approximately 3,000 cu. ft./hr. resulted in the following tabulated findings:

TABLE I

|  | Principal meter | Lobe-type meter |
| --- | --- | --- |
| Rate of Delivery | Essentially uniform | Harmonic cyclic variations (4 cycles per rotor revolution) were ±10% of mean output. |
| Pressure Pulsation | Insignificant | Materially large. |
| Noise of Operation | Quiet | Noisy, produced a "beating" sound. |
| Accuracy Curve over Operating Flow Range. | Practically uniform; fluctuation on an order of ±0.1% or less. | Irregular; fluctuations about ±1%. |
| Head Loss Curve over Operating Flow Range. | Essentially smooth | Significantly large; irregular variations. |
| Rotor Speed at Rated Capacity | Low—(1,300 r.p.m.) | High—(2,250 r.p.m.). |
| Fluid Seal | All area seals | Line seal between the rotors. |
| Running Clearances | Large—(0.006″ approx.) | Small—(0.0015″ to 0.003″). |
| Timing between the Two Rotating Members. | Not critical | Critical. |
| Drive between the Two Rotating Members. | Single member non-alternating drive. | Alternating drive causing a back lash phenomenon and uneven wear on parts. |
| Timing Gears | Non-precision gears of coarse pitch. | Precision gears of fine pitch. |
| Load on Timing Gears | A low, uniform load | A high, cyclic impact load. |
| Operation in Dirty Fluids | Less susceptible to jamming due to foreign particles in the fluid. | More susceptible to jamming due to foreign particles in the fluid. |
| Stuffing Box | Not required | Required. |
| Disassembling and Assembling | The meter can be readily disassembled and assembled by a non-technical person without change in meter calibration. | The meter cannot be readily disassembled and assembled by a non-technical person without change in meter calibration. |

Hence, it is seen that our novel meter has an essentially uniform rate of discharge throughout the cycle of operation resulting in a substantially pulsation free output achieved by the special design of the rotor and the rotary abutment. Non-critical timing and the non-alternative driving of the timing gears plus the uniform delivery, are features which allow the use of non-precision (less expensive) gears of coarse pitch which are less susceptible to jamming due to the presence of foreign particles. The small and uniform load on the gear teeth results in low and even wear. However, large wear can be tolerated without affecting the performance of our novel meter.

The geometry and construction of our novel meter is also very simple—just cylindrical and flat surfaces. By using area seals, the running clearance between the moving and stationary parts can be made unusually large. Since all the rotating members have sharp sweep edges, the meter is self-cleaning. The meter has a long, trouble-free expected useful life, even when used to meter dirty fluids, such as gas from oil wells.

Our invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A positive displacement rotary fluid metering apparatus embodying:
 (a) a body having fluid influent and effluent openings;
 (b) a fluid driven rotor mounted on a first shaft journalled in said body, said rotor having planar non-radial vanes positioned to minimize pulsation and head loss;
 (c) a rotary abutment mounted on a second shaft journalled in said body, the assembly of said rotary abutment and said second shaft being driven by said rotor through shaft-mounted timing gears, said rotary abutment being shaped to spacedly mate with said vanes during rotation to provide for gradual entry of said vanes with substantial lessening of impact against the fluid;
 (d) flow recording means;
 (e) means responsive to the rotation of said first shaft for actuating said flow recording means;
 (f) stationary abutment means mounted to said body within said rotor and adjacent said rotary abutment to maintain at least two area seals between said influent and effluent openings during all operative positions.

2. The apparatus of claim 1 wherein said planar non-radial vanes are longitudinally parallel to the axis of said first shaft and are secured at one end to a rotor hub mounted on said first shaft.

3. The apparatus of claim 1 wherein said planar non-radial vanes are radially inclined at an angle on the order of 16° to cause the inner edges of said vanes to lead their outer edges in the usual direction of rotation.

4. The apparatus of claim 1 wherein said planar non-radial vanes have a relatively narrow thickness to reduce head loss and yet are sufficiently thick to provide area seals at said body and said stationary abutment means during all operative positions, said thickness being on the order of 0.2 of an inch.

5. The apparatus of claim 2 wherein the narrow planar non-radial vanes are secured at their ends opposite said rotor hub to an annular ring-shaped end plate whereby said vanes are rigidified and restrained against flexure.

6. A positive displacement rotary fluid metering apparatus having nominal head loss through its entire operating range including:
 (a) a body having fluid influent and effluent openings;
 (b) a fluid driven rotor having planar vanes and being mounted on a first shaft journalled in said body;
 (c) a relatively light weight rotary abutment mounted on a second shaft journalled in said body and driven by said rotor through shaft-mounted timing gears, said rotary abutment being shaped to spacedly mate with said vanes during rotation and including:
  (1) hub structure non-rotatably concentrically carried by said second shaft;
  (2) a plurality of elongated thin arcuate shells concentric about said second shaft and shaped to maintain area seals between said influent and effluent openings during all operative positions, and (3) a plurality of bifurcated arcuate support ribs interconnecting said hub structure and said shells solely at their longitudinal central regions;

(d) flow recording means;

(e) means responsive to the rotation of said first shaft for actuating said flow recording means, and (f) stationary abutment means mounted in said body within said rotor and adjacent said rotary abutment to maintain at least two area seals between said influent and effluent openings during all operative positions.

7. The apparatus of claim 6 wherein the external periphery of each said shell has a plurality of substantially longitudinally extending relatively narrow raised portions separated by relatively wide recess portions, at least one of said raised portions forming an area seal at said body and at least one of said raised portions forming an area seal at said stationary abutment during all operative positions; whereby said apparatus is self-cleaning even when metering dirty fluids and whereby frictional drag and resulting head loss is appreciably reduced.

8. A positive displacement rotary fluid metering apparatus comprising:

(a) a housing having fluid inlet and outlet openings communicating with a metering chamber;

(b) a fluid driven rotor having planar vanes and being mounted on a first shaft journalled in said chamber;

(c) a rotary abutment mounted on a second shaft journalled in said chamber, said rotary abutment having radially outwardly opening recesses shaped to spacedly receive said vanes during rotation;

(d) a pair of meshing timing gears for continuously driving said rotary abutment only through rotation of said first shaft and in timed relation with said rotor to cyclically move said vanes through said recesses in spaced relation to said rotary abutment;

(e) register means;

(f) means responsive to the rotation of said first shaft for actuating said register means, and (g) stationary abutment means delimiting a flow path for fluid moving through said chamber from said inlet opening to said outlet opening, said stationary abutment means being mounted radially between said vanes and said first shaft and having a radial surface cooperating with surface means on said radial abutment to define a moving fluid seal therebetween said rotor and adjacent said rotary abutment.

9. A positive displacement rotary fluid metering apparatus comprising:

(a) a body having:

(1) fluid inlet and outlet openings;

(2) a fluid transmitting chamber in fluid communication with said openings, and (3) at least one lubrication distribution chamber;

(b) a fluid driven rotor having vanes and being mounted within said fluid transmitting chamber on a first shaft journalled in said body;

(c) a rotary abutment mounted within said fluid transmitting chamber on a second shaft journalled in said body and driven by said rotor through shaft mounted timing gears, said rotary abutment being shaped to spacedly receive said vanes during rotation;

(d) register means;

(e) means responsive to the rotation of said first shaft for actuating said register means;

(f) stationary abutment means mounted in said fluid transmitting chamber radially inwardly of said vanes and adjacent said rotary abutment, (g) a partition between said fluid transmitting and lubrication chambers and having an aperture through which at least one of said shafts extend, and (h) an oil seal bushing non-rotatably mounted on said at least one shaft in said aperture and having a radially extending annulus extending radially outwardly from a region intermediate its ends and cooperating with means in said aperture for causing excess oil to drain back toward said lubrication chamber, the end of said bushing disposed adjacent to the end of said shaft extending into said lubrication chamber being disposed concentrically between said shaft and an anti-friction shaft support bearing.

10. A positive displacement rotary fluid meter comprising:

(a) a housing having spaced apart fluid inlet and outlet passages communicating with a metering chamber, (b) means including an abutment rotatably mounted in said chamber for defining a fluid flow channel between said inlet and outlet passages, (c) register means, (d) a fluid driven metering rotor for driving said register means and being rotatably mounted in said chamber radially adjacent to said abutment, said rotor having angularly spaced apart vanes movable through said channel under the influence of fluid flow, (e) means providing radially outwardly opening recesses in said abutment, and (f) means for rotating said abutment in timed relation with said rotor to provide for entry of said vanes into said recesses as they advance in a predetermined direction between said passages, (g) said vanes having parallel planar surfaces facing in the direction of fluid flow through said channel and each being so canted from a radial line that the inner edge thereof leads the outer edge thereof in the direction of rotor rotation.

11. The positive displacement rotary fluid meter defined in claim 10 wherein said each of said vanes are formed with oppositely facing, parallel, planar surfaces.

12. The positive displacement rotary fluid meter defined in claim 10 wherein said means defining said flow channel further includes stationary abutment means disposed in said chamber radially inwardly of said vanes, said rotatably mounted abutment having a series of lands movable in sealing relation with the periphery of said stationary abutment means to block fluid against bypassing said flow channel, said lands being so spaced apart that at least two are in sealing relation with said housing in any operative position of said rotatably mounted abutment.

13. A positive displacement rotary fluid meter comprising:

(a) a housing having fluid inlet and outlet openings, (b) wall means in said housing dividing the interior thereof into a fluid metering chamber communicating with said openings and a lubrication chamber, (c) a pair of spaced apart shafts extending through apertures in said wall means, (d) anti-friction bearing means in said apertures for journalling said shafts, (e) means including an abutment mounted on one of said shafts in said metering chamber for defining a fluid flow channel between said inlet and outlet openings, (f) a vaned, fluid driven rotor mounted on the other of said shafts in said metering chamber and having its vanes disposed in said channel, (g) means providing outwardly opening recesses on said abutment, (h) gear means disposed in said lubrication chamber and drive connecting said shafts to rotate said abutment in such relation to said rotor that the vanes of said rotor enter said recesses as they advance in a predetermined direction between said openings, (i) a bushing mounted on at least one of said shafts in its associated aperture in said wall means, (j) said bushing having one end providing a seat for said bearing means and an annulus extending radially outwardly at a region axially along said one shaft between said seat and said metering chamber, said annulus cooperating with means in said aperture for draining lubricant back to said lubricating chamber.

References Cited by the Examiner

UNITED STATES PATENTS

| | | | |
|---|---|---|---|
| 2,710,540 | 6/1955 | Grote | 73—261 |
| 2,713,261 | 7/1955 | Butterworth et al. | 73—231 X |

FOREIGN PATENTS

| | | |
|---|---|---|
| 784,022 | 7/1935 | France. |
| 754,984 | 8/1956 | Great Britain. |

RICHARD C. QUEISSER, *Primary Examiner.*

J. C. GOLDSTEIN, *Assistant Examiner.*